Aug. 16, 1960  R. L. SIMONS  2,949,172
POSITIVE LOCK ELECTROMAGNETIC BRAKE STRUCTURE
Filed Dec. 16, 1958  4 Sheets-Sheet 1

INVENTOR.
ROBERT L. SIMONS
BY
Flam and Flam
ATTORNEYS.

Aug. 16, 1960     R. L. SIMONS     2,949,172
POSITIVE LOCK ELECTROMAGNETIC BRAKE STRUCTURE
Filed Dec. 16, 1958     4 Sheets-Sheet 2
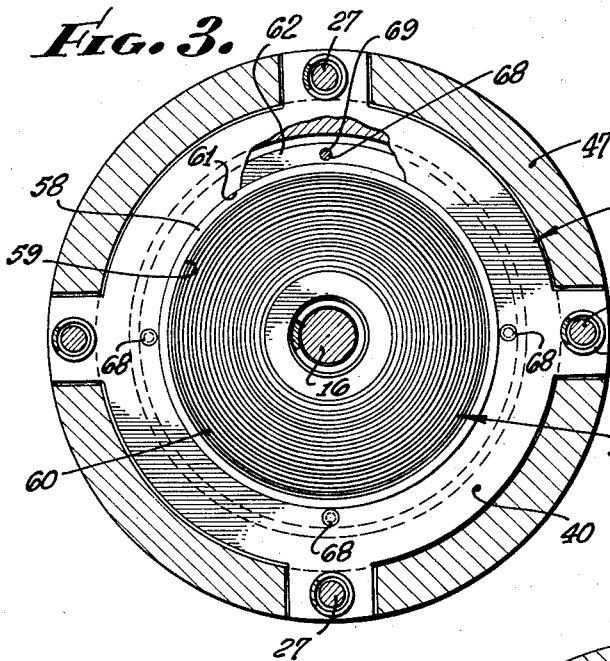
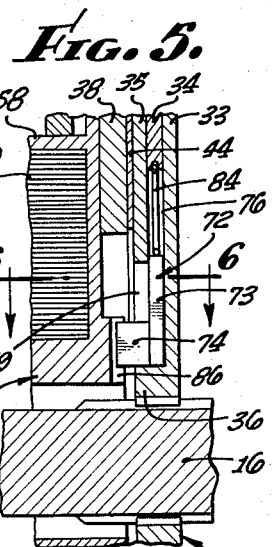
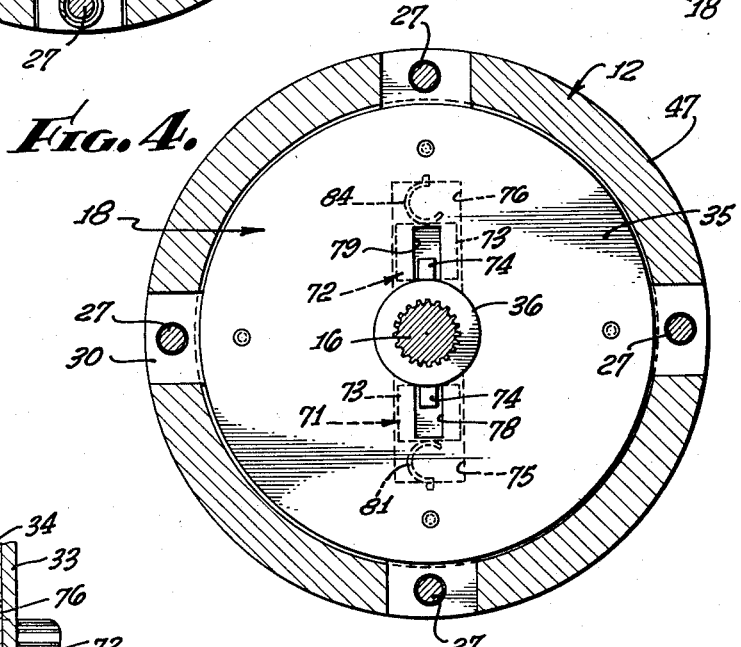
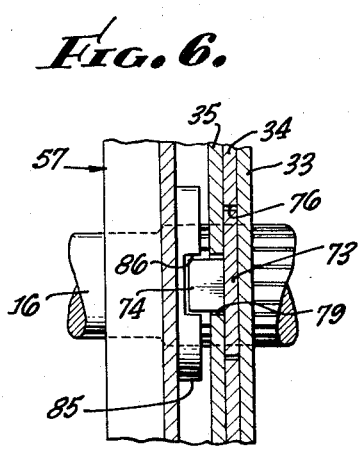
INVENTOR.
ROBERT L. SIMONS
BY
Flam and Flam
ATTORNEYS.

Aug. 16, 1960     R. L. SIMONS     2,949,172
POSITIVE LOCK ELECTROMAGNETIC BRAKE STRUCTURE
Filed Dec. 16, 1958     4 Sheets-Sheet 3
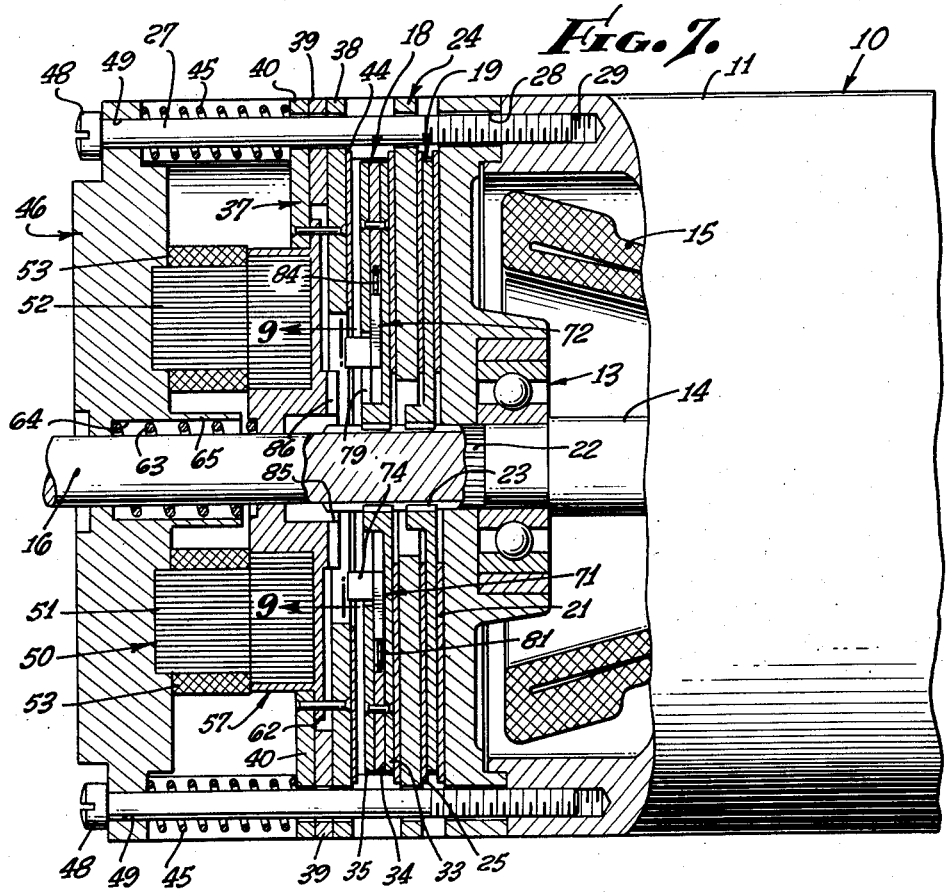
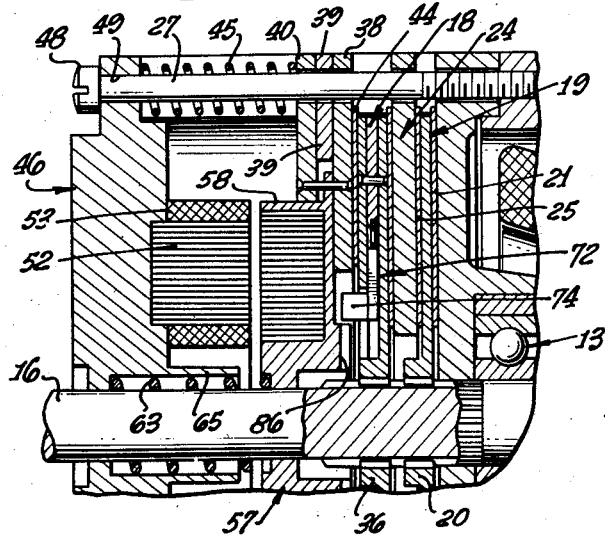
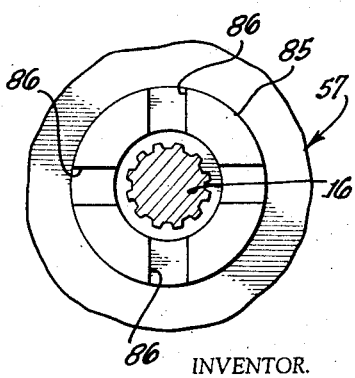
INVENTOR.
Robert L. Simons
BY
Flam and Flam
ATTORNEYS.

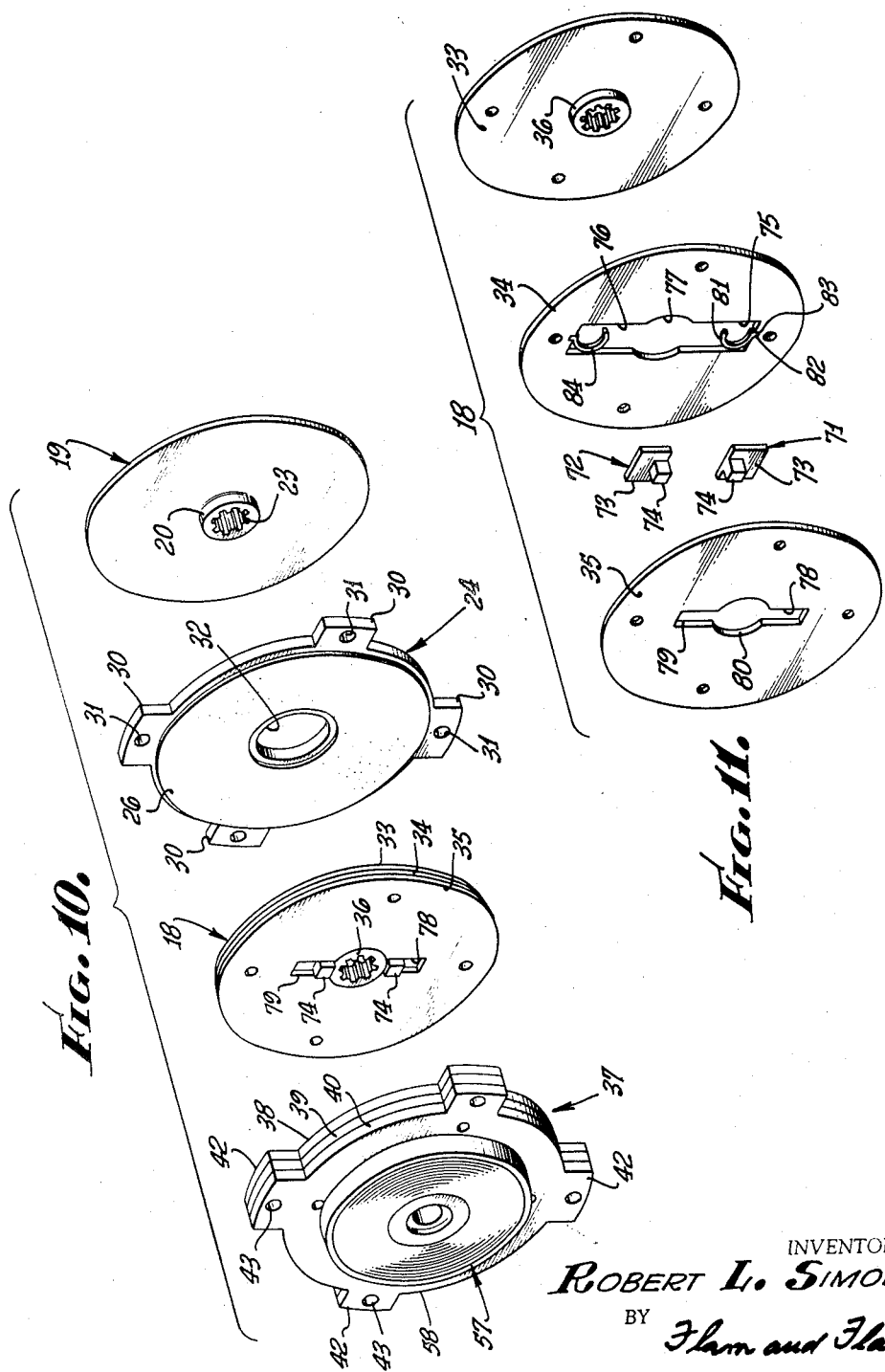

United States Patent Office 2,949,172
Patented Aug. 16, 1960

2,949,172

POSITIVE LOCK ELECTROMAGNETIC BRAKE STRUCTURE

Robert L. Simons, Buena Park, Calif., assignor to U.S. Electrical Motors, Inc., Los Angeles, Calif., a corporation of California Filed Dec. 16, 1958, Ser. No. 780,797

6 Claims. (Cl. 188—171)

This invention relates to electromagnetic brake structures, intended to prevent rotational movement of parts by positive locking action.

In a typical electromagnetic brake structure, non-rotary braking elements are caused to bear against one or more disks mounted on the rotary part, as by the aid of compression springs. An armature is moved electromagnetically to move the non-rotary elements to brake releasing position against the force of the springs. This arrangement is particularly useful with an electric motor, the circuitry being quite simple by virtue of the fact that circuits for the motor and the electromagnetic brake are intended to be simultaneously energized and de-energized. On failure of power or upon intentional interruption of the motor circuit, the circuit to the electromagnet is correspondingly interrupted and the brakes are automatically applied. Often a motor and brake structure are housed together as a unit.

Friction brakes are quite effective in quickly stopping a rotating device, but they are subject to the disadvantage that vibration often encountered in airborne equipment or acceleration of such equipment can cause undesirable creeping from standstill. The primary object of this invention is to provide a positive lock brake structure in which rotation of the shaft is positively prevented when the brakes are applied. In order to accomplish this function, a dog lock or detent is utilized that is released upon energization of the electromagnet and motor, for example, and that is projected to locking position only after the shaft rotation is virtually stopped.

It is desired that the positive lock be automatically operable so that separate releasing operations are not required. Furthermore, it is desirable that the friction brake be released only if the positive lock is first released, and that the positive lock be operative only after the friction brake has halted movement. These sequences of operation are critical if damage to parts is to be avoided.

Apparently this requirement seems to necessitate the use of relays or equivalent time delay or complicated sequence dependent parts.

Furthermore, a substantial consideration is the simplicity of the structure itself. Added or supplemental power means to actuate or release a supplemental lock ostensibly are also required.

The primary object of this invention is to provide a novel combination brake that is automatically operable, that requires no relays, supplemental power means, or the like, and that operates in the desired sequence.

For this purpose, convenient use is made of the very electromagnet that releases the friction brake. Use is made of a novel armature structure that moves conventionally in an axial direction. Axial movement in one direction causes the positive lock to be released, and the friction brakes are also released. A detent forming the positive lock is carried by the rotating part, and by centrifugal action, and its own inertia is held out of operative position until rotation is virtually stopped, at which time the armature has returned to a position receptive to co-operation with the detent. Quick release is thus accomplished with lagging return.

In order to release the detent, however, definite axial movement of the armature is required. Thus brake structures are normally designed with a very small running gap between the armature and the magnet so that the electromagnet of small size can pull the armature to released position against the force of the springs normally applying the brakes. This is especially crucial in airborne installations so that heavy and bulky parts are avoided. A substantial power problem, therefore, is involved in order to allow for the increased required axial movement of the armature.

The important object of this invention is to provide an electromagnetic structure of this character in which the electromagnet is capable of releasing the positive lock and overcoming the force exerted by the springs seating the brake, all without any increase in the capacity or size of the electromagnet itself. This object is accomplished by making the armature in two parts having a lost motion with respect to each other. The first part of the lost motion is used to release the positive lock device without releasing the friction brake. Thus the power required is readily available from the electromagnet which can readily move the armature through this stage even though it is substantially spaced from the magnet, and because the electromagnet is not then taxed with the job of overpowering the heavy springs applying the friction brakes. The final part of the movement of the armature is utilized to release the brake, but the armature is now close to the core so that power is effectively utilized. This lost motion arrangement also further ensures the desired sequence of operation.

Another object of this invention is to provide a compact brake structure of this character that readily can be accommodated within housings built for standard brakes.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a fragmentary axial sectional view illustrating, by way of example, a motor brake unit incorporating the present invention;

Figs. 2, 3 and 4 are sectional views taken along planes corresponding to lines 2—2, 3—3 and 4—4 of Fig. 1;

Fig. 5 is an enlarged fragmentary sectional view showing the detent and armature structure of Fig. 1, but the detents in locked position;

Fig. 6 is a fragmentary sectional view taken along the plane indicated by line 6—6 of Fig. 5;

Fig. 7 is an axial sectional view similar to Fig. 1, but illustrating the brake in released position, the armature being attracted;

Fig. 8 is a fragmentary sectional view similar to Figs. 1 and 7, but showing the apparatus immediately after release of the electromagnet and application of the brakes and prior to entrance of the detents into locking position;

Fig. 9 is a fragmentary sectional view taken along the plane indicated by line 9—9 of Fig. 7 and showing specifically the configuration of the recesses in the armature itself which cooperate with the detents;

Fig. 10 is an exploded view showing the relationship between the rotating disks, the armature and the stationary brake disk; and Fig. 11 is an exploded view illustrating the parts of that rotating brake disk cooperating with the armature, and which mounts the detents.

Figure 1:
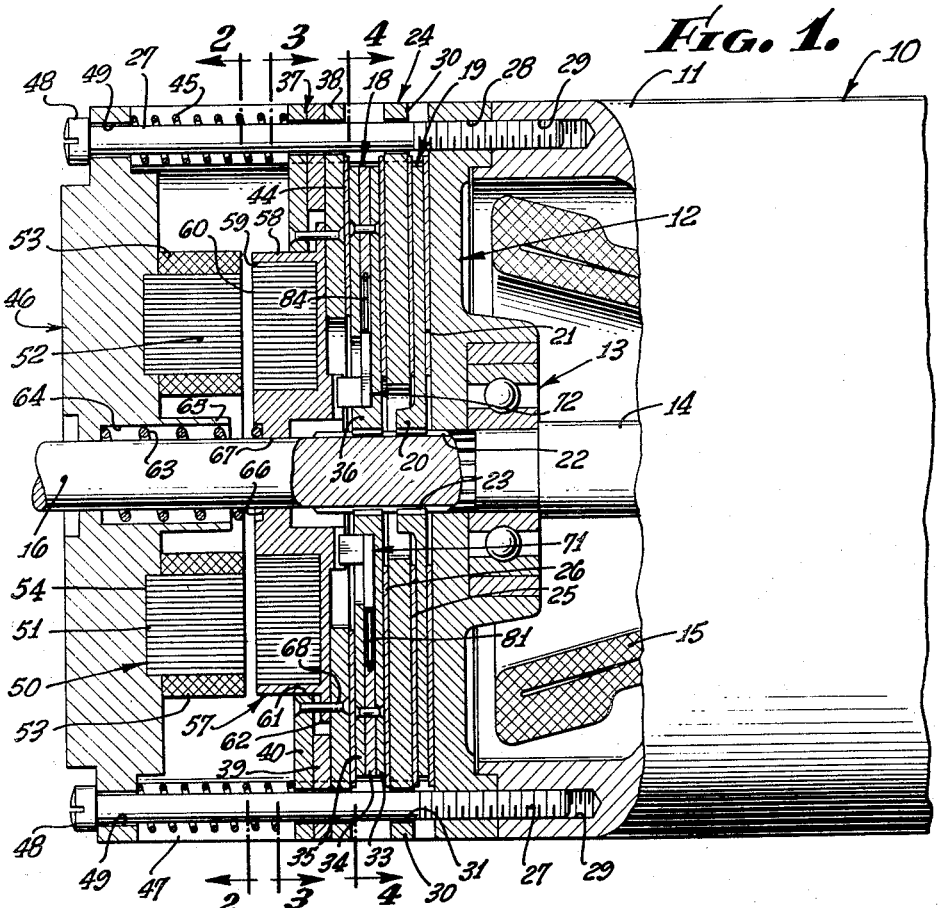

In Fig. 1 there is illustrated a motor brake unit 10 which incorporates a shell-type housing 11 in which stator laminations (not shown) are accommodated. Stator windings 15 are carried by the laminations. A bearing bracket 12 fits telescopically over the end of the shell 11 and mounts a bearing structure 13 for the shaft 14 of the motor. The rotor is mounted on the shaft 14.

The shaft 14 has a reduced extension 16 projecting beyond the bearing bracket 12 and upon which the rotary parts of the friction brake are mounted.

In the present example, the rotary parts of the brake structure include a pair of axially movable brake disks indicated generally by the reference characters 18 and 19 (see also Fig. 10). The brake disk 19 has a central hub portion 20 through which the shaft extension 16 extends. The disk 19 rotates with the shaft 14 but is axially movable therealong in order to engage at its inner surface, brake lining 21 conveniently mounted upon the outersurface of the bearing bracket 12. For this purpose, the shaft extension 16 carries splines, as at 22, and the hub 20, as well as the disk 19 itself, has a through aperture 23 formed to fit the splined portion of the shaft 22.

A non-rotary but axially movable braking element 24 (Fig. 10) is engageable with the other or outer side of the brake disk 19 for braking action therebetween and for moving the disk 19 toward the bearing bracket 12. The non-rotary element carries brake facing or lining material 25 and 26 on both sides thereof. It is mounted for axial movement by a plurality of posts 27 (see Figs. 3 and 4) extending parallel to the axis of the shaft 14. These posts are in the form of cap screws or bolts, and are spaced angularly about the axis of the shaft 14. The bolts 27 have threaded ends passing through apertures 28 in the bearing bracket 12 and into threaded recesses 29 formed in the corresponding end surface of the shell 11.

The non-rotary brake element 24, as shown most clearly in Fig. 10, has a plurality of lugs or ears 30 each provided with an aperture 31 through which the bolts 27 respectively extend. Accordingly, the non-rotary brake element 24 is supported for axial movement.

The non-rotary brake element 24 has a central aperture 32 that provides ample clearance for the hub 20 of the brake disk 19.

The rotary brake disk 18, although a composite structure as shown in Fig. 11, acts as a rotary unit bearing against the outer side of the non-rotary brake element 24.

The brake disk 18 includes three stacked plates 33, 34 and 35 riveted together and to be described more fully hereinafter. One of the end plates 33 has a central hub 36 similar to the hub 20 of the brake disk 19. The hub 36 is similarly formed to fit the splined portion 22 of the shaft extension 16 so that the brake disk 18, while rotatable with the shaft 14, is axially movable therealong.

Finally the final element of the brake system comprises the non-rotary armature assembly 37. The armature assembly 37 includes three stacked rings or plates 38, 39 and 40 (Fig. 10) riveted together and to be described more fully hereinafter. Like the non-rotary brake element 24, the connected rings or plates together form angularly spaced ears 42, each provided with a through aperture 43 for mounting upon the posts 27. The plate or ring 38 of the armature assembly 37 next adjacent the brake disk 18 carries lining 44 (Fig. 1) which engages the brake disk 18.

Upon each post 27 is mounted a compression spring 45 which urges the armature assembly toward the right and in a direction to cause the elements of the brake system 12, 19, 24, 18 and 37 to engage serially.

Figure 2:
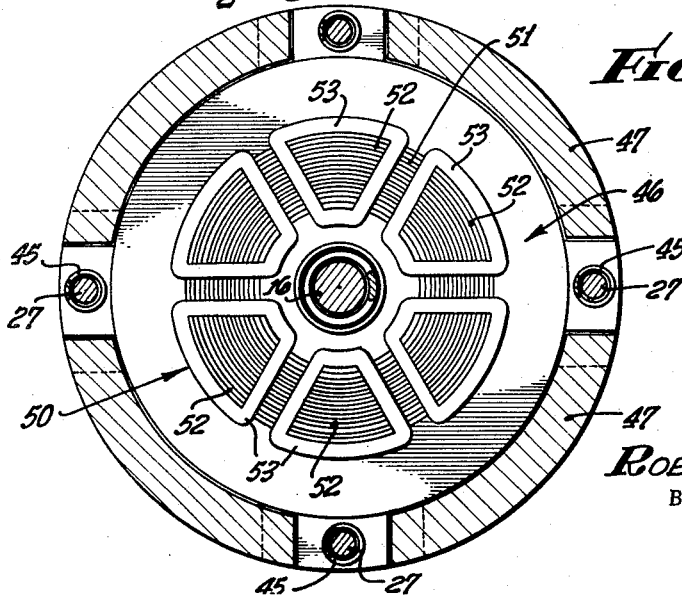

An end cap 46 encloses the brake elements and also provides a means against which the compression springs 45 react. The bearing bracket 12 has integrally formed thereon, a series of arcuate wall sections 47 (see Figs. 2, 3 and 4). These sections extend between adjacent posts 27 and ears of the non-rotary brake elements 18 and 19. The arcuate wall sections 47 are engaged by the inner surface of the cap 46. The parts 27 pass through apertures 49 in the cap 46, and their heads 48 engage the edges at the outer side of the apertures of the cap 46. By tightening down the screws or posts 27 the cap 46 is drawn firmly against the wall sections 47 of the bracket 12, which in turn is clamped against the end of the motor shell 11.

To release the brake, an electromagnet 50 is provided. The electromagnet 50 comprises spirally wound laminations 51 (see Fig. 2) upon which are formed, as by three diametric slots at one end, six poles 52. Each pole or projection 52 carries a coil 53 for magnetization. The spirally formed laminations 51 are accommodated within an annular recess 54 (see Fig. 1) which is appropriately formed on the inner wall of the cap 46.

As shown in Figs. 1 and 3 an annular armature 57 projects through an aperture 61 of the end ring 40. The armature comprises an annular support 58 providing a circular channel or recess 59 in which spirally wound laminations 60 are accommodated.

The armature 57 is connected to the rings 38, 39, 40 by the aid of a flange 62 formed peripherally at the end of the armature shell 57 remote from the opening of the channel. This flange 62 is accommodated in an annular clearance space or inwardly opening recess or channel provided by the intermediate plate 39, the inner diameter of the intermediate plate 39 being greater than the inner diameter of the outer plate 40, and that of the flange 62. The thickness of the intermediate ring 39 is furthermore substantially in excess of the thickness of the annular flange 62. Thus the armature 57 and the rings 38, 39, 40 are axially movable relative to each other between limits defined by the end plates 38 and 40 and to an extent corresponding to the relative dimensions of the intermediate ring 39 and the armature shell flange 62.

A light coil compression spring 63 normally urges the armature 57 away from the electromagnet 50 and against the end plate 38 remote from the electromagnet 50.

The coil spring 63 is accommodated in a recess 64 extending inwardly from the inner surface of the cap 46, the recess 64 being extended axially by the aid of an annular projection 65. The right-hand end of the compression spring 63 is seated in an annular recess 66 of the armature shell structure 58 formed at the end of a central opening 67, the opening having a running fit with the shaft extension 16.

The armature 57 is held against rotation relative to the non-rotary rings 38, 39, 40. This is accomplished by the aid of rivets fastening the plates 38, 39 and 40 together. The rivets 68 pass with clearance through apertures 69 (Figs. 1 and 3) in the armature shell flange 62.

In the position illustrated in Fig. 1, the rotary brake disks and non-rotary brake elements are urged together and toward the bearing plate 12. Furthermore, the rotary brake disk 18 interlocks with the armature 57 which is non-rotary, thereby positively preventing the brake disk 18 and hence the shaft 14 from rotating. The rotary brake disk 18 which is adjacent the armature serves as a mounting for movable detents 71 and 72 (Fig. 11). The detents are identical, and include a plate or mounting portion 73 (Fig. 11) and a projection 74 extending laterally at one end of the plate 73. The plates 73, which are rectangular, are slidable in radial slots 75 and 76 of an intermediate disk part 34. These slots are wide enough to accommodate the plates 73. The slots 75 and 76 extend inwardly to the central aperture 77 of the part 34. The end disk parts 33 and 35 confine the plates to the slots 75 and 76. The exterior surface of the boss 36 limits inward radial movement of the detents 71 and 72.

The end plate 35 adjacent the armature 57 has a pair of diametrically disposed slots 78 and 79, narrower than slots 75 and 76, and through and beyond which the projections 74 of the detents extend (Fig. 10). The slots 78 and 79, like the slots 75 and 76 of the intermediate plate 34, project to the central aperture 80 of the disk part 35.

A light C-spring 81, mounted in the slot 75 in which the detent 72 is slidable, urges the detent 72 radially inwardly. The C-spring 81 has a mounting foot portion 82 accommodated in a recess 83 at the outer end of the slot 75. The spring 81 bears against the end surface of the plate 73. A similar C-spring 84 is provided for the other slot 76 and the detent 71.

The rear surface of the armature 57 has a central boss 85 (see Fig. 9) that has a series of peripherally opening recesses 86 spaced angularly about the axis of the device. The recesses 86 in this instance number four, and are formed by cross-slotting the end surface of the boss 85. As shown in Fig. 1, the detent projections 74 as a diametric pair, enter a diametric pair of recesses 86 when the detents are at their inward limits and the armature 54 is urged toward the brake disk 18. Obviously the disk 18, by virtue of interengagement of the disk projection 74 with the armature recesses 86, is precluded from rotating.

To release the disk 18, the armature structure 57 is urged toward the electromagnet 50 so that the projections 74 leave the armature recesses 86 via the open sides thereof at the end of the boss 85. Even though the armature is initially spaced from the magnet a fair distance, it is readily moved sufficiently to release the detents, the reason being that the rings 38, 39, 40 need not yet move. Thus when the armature shell flange 62 engages the ring 40, the detents are released. Finally, the armature 57 begins to pull the non-rotary brake element against the force of the springs 45 when the armature is close to the magnet. Ample power is thus available. The spring 63 is relatively light, facilitating the retraction of the armature 57 even though it is relatively far from the magnet face; but springs 45 more forcefully act to urge the brake elements together. The springs 45, of course, are not compressed during initial movement of the armature 57, but are further compressed only when the armature lies quite close to the magnet face.

By appropriate proportioning, the detents project axially only a slight distance when the brake lining is new. As the brake lining wears, the detents project further. But even when the lining has reached its limit of life, the lost motion of the armature is sufficient to release the detents from captive relationship.

Assuming that the motor is energized, then the rotating apparatus comes up to speed, the detents 71 and 72, by centrifugal action move outwardly in the slots 75 and 76 and compress the springs 81 and 84. At full speed the detents 71 and 72 lie entirely beyond the axial projection of the periphery of the armature boss 85, and as indicated clearly in Fig. 7. When the motor is deenergized, the armature 57 is released. Not only are the brake disks and non-rotary elements urged together by the compression springs 45, but the armature 57 is urged inwardly by the central light spring 63. The boss 85 of the armature immediately enters within the orbit described by the projections 74 of the detents. The brake action is quick relative to the inertia of the detents. Hence the disk 18 carrying the detents is virtually stopped before the detents being to move inwardly (Fig. 8).

The detents move inwardly and engage the peripheral portion of the boss 85, unless a chance alignment with the recesses 86 occurs. Subsequent movement of the shaft 14 more than a quarter of a revolution will be prevented by virtue of the fact that such rotation will inevitably place the projections 74 into alignment with the recesses 86 whereupon the parts will resume the position illustrated in Fig. 1.

The inventor claims:

1. In a combination positive brake structure: a rotary shaft; movable detent means carried by the shaft for rotation therewith and biased inwardly toward the axis of the shaft and mounted for movement away from the shaft by centrifugal action so that said detent means describes an orbit; a releasable drag brake structure for the shaft including a member mounted for limited movement in an axial direction for controlling the drag brake structure; said member having a non-rotary part adapted to project within the orbit of said detent means at one limited position; said part having means forming a space in which the detent means may be received upon movement of the detent means inwardly and upon angular alignment of the space and the detent means; said space opening laterally whereby the member part is retracted from the detent means upon movement of the member to its other limited position.

2. In a combination positive brake structure: a rotary shaft; a pair of diametrically disposed movable detent means carried by the shaft for rotation therewith and biased inwardly toward the axis of the shaft and mounted for movement away from the shaft so that said detent means describes an orbit; a releasable drag brake structure for the shaft including a member mounted for limited movement in an axial direction for controlling the drag brake structure; said member having a non-rotary part adapted to project within the orbit of said detent means at one limited position; said part having a diametric slot means at its end surface, the periphery of said part being otherwise substantially annular; the detent means being receivable in the slot means upon alignment of the slot means and the detent means to limit movement of said shaft.

3. In a combination positive brake structure: a rotary shaft; movable detent means carried by the shaft for rotation therewith and biased inwardly toward the axis of the shaft and mounted for movement away from the shaft by centrifugal action so that said detent means describes an orbit; a releasable drag brake structure for the shaft, including an electromagnet, a non-rotary armature assembly, said armature assembly including an armature part and a brake actuator part supported for limited movement with respect to each other in a direction parallel to said shaft; means independently operable biasing the brake actuator part and the armature part in a corresponding direction relative to the actuator part so that said armature part is in one limited position with respect to said actuator part; said armature part having a portion adapted to project within the orbit of said detent means when said parts are both at said limited positions away from said electromagnet; said portion having means forming a space within which the detent means may be received upon movement of the detent means inwardly and upon angular alignment of the space and the detent means; said space opening laterally whereby the armature part is retracted from the detent means upon movement of the armature part to its other limited position with respect to said actuator part.

4. In an electromagnetic brake structure: a rotary shaft; a mounting carried by the shaft and including two parts secured together; a detent including a support and a projection extending laterally of the support; one mounting part having means forming a recess in which the support is slidable so that the projection when the support is in recess is confined for movement radially toward and away from the axis of the shaft; the other mounting part confining the support to the recess; one of said mounting parts having an access opening through which the projection extends; a spring in the recess urging the detent toward the axis, the detent being movable away from said axis by centrifugal action so that said projection describes an orbit; releasable drag brake structure for the shaft, including a member mounted for limited movement in an axial direction for controlling the drag brake structure; said member having a non-rotary part adapted to project within the orbit of said projection at one limited position of said member; said non-rotary part having means forming a space in which the projection may be received upon movement of the detent inwardly and upon angular alignment of the space and the projection; said space opening laterally whereby the member part is retracted from the projection upon movement of the member to its other limited position.

5. In a combination positive brake structure: a rotary shaft; movable detent means carried by the shaft for rotation therewith and biased inwardly toward the axis of the shaft and mounted for movement away from the shaft by centrifugal action so that said detent means describes an orbit; a releasale drag brake structure for the shaft, including an electromagnet and a non-rotary armature assembly; said armature assembly including a brake actuator part extending about said axis, and providing a radially inwardly opening recess extending circularly about said axis; said armature assembly also including an armature part having a peripheral portion extending with lateral clearance into said recess whereby the assembly parts are movable with respect to each other; the direction of relative movement being substantially parallel to said shaft; independently operable means biasing the brake actuator part away from the electromagnet and the armature part in a corresponding direction relative to the actuator part so that said armature part is in one limited position with respect to said actuator part; said armaure part having a portion adapted to project within the orbit of said detent means when said parts are both at said limited positions away from said electromagnet; said portion having means forming a non-annular radially outwardly opening space within which the detent means may be received upon movement of the detent means inwardly and upon angular alignment of the space and the detent means; said space also opening laterally whereby the armature part is retracted from the detent means upon movement of the armature part to its other limited position with respect to said actuator part.

6. In an electromagnetic brake structure having relatively axially movable rotary and non-rotary brake parts, and an electromagnet for causing relative axial motion of the brake parts, the combination therewith of a positive lock between the brake parts when the parts are in braking contact, including: a locking member; a mounting for the locking member and rotatable with the rotary brake part, said mounting having means determining a path of movement of said locking member radially inwardly and outwardly of the axis of rotation; said locking member being urged outwardly of said mounting by the action of centrifugal force; means operative when rotation has ceased for urging the member inwardly; and means defining a non-rotary pocket for said member, and capable of receiving said member when said member is moved inwardly of its path, said pocket defining means being movable in an axial direction upon release of the brakes for freeing said member.

No references cited.